H. F. BARBER.
EXCAVATING MECHANISM FOR BEET HARVESTERS.
APPLICATION FILED AUG. 10, 1909.
962,880.
Patented June 28, 1910.
2 SHEETS—SHEET 2.
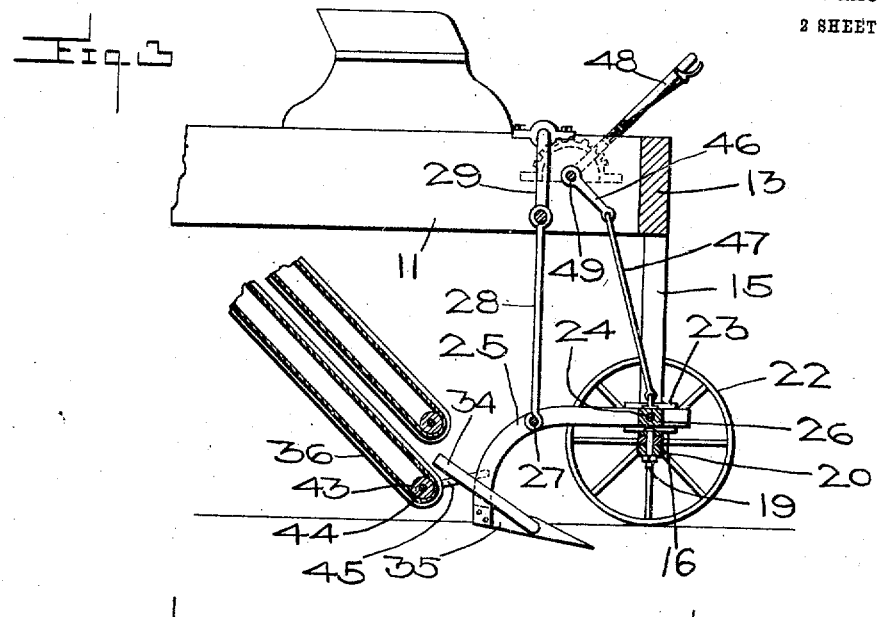
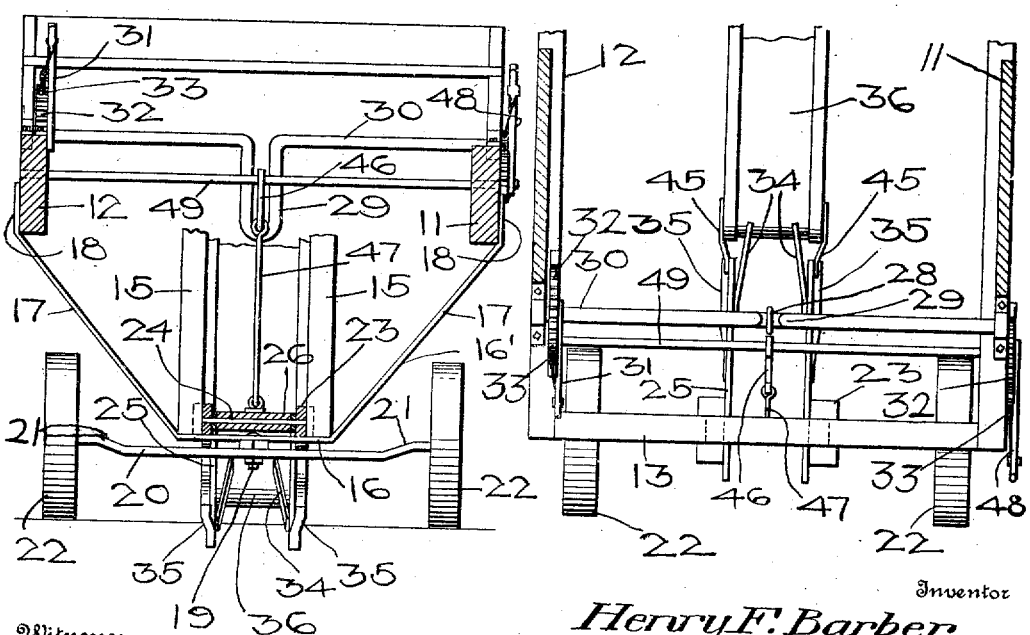
Witnesses
Ed. R. Lusby
M. L. Low
Inventor
Henry F. Barber
By Woodward & Chandler
Attorneys

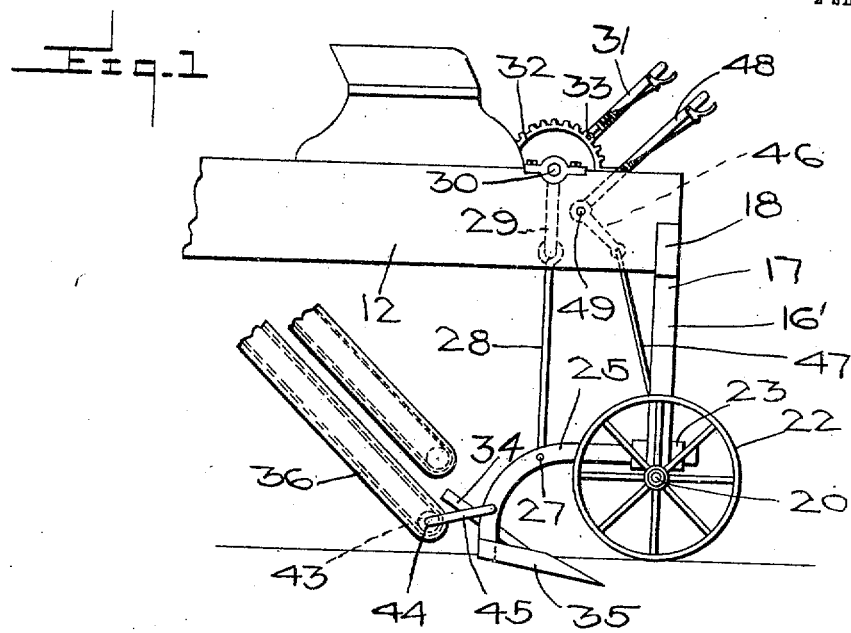
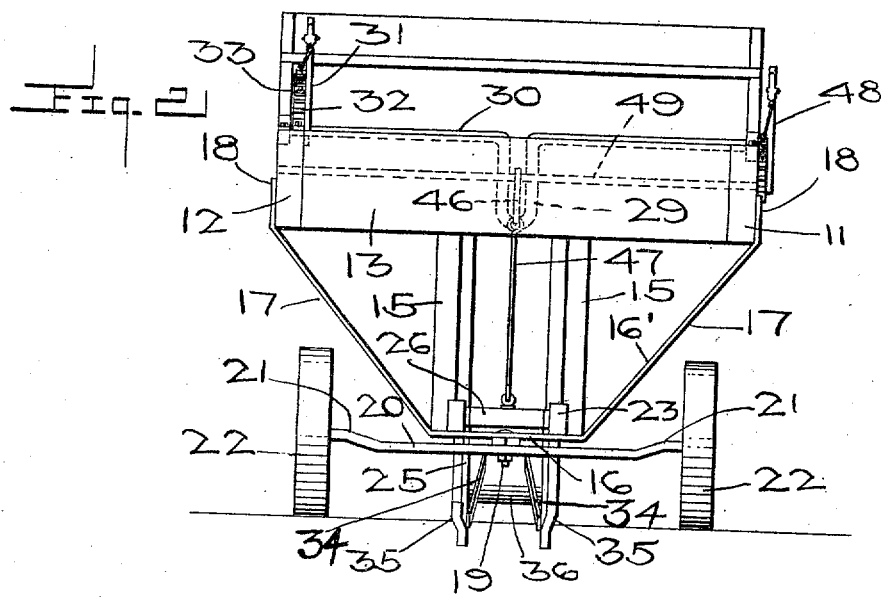

UNITED STATES PATENT OFFICE.

HENRY F. BARBER, OF EDISON, NEBRASKA.

EXCAVATING MECHANISM FOR BEET-HARVESTERS.

962,880.  Specification of Letters Patent.  Patented June 28, 1910.

Application filed August 10, 1909. Serial No. 512,127.

*To all whom it may concern:*

Be it known that I, HENRY F. BARBER, a citizen of the United States, residing at Edison, in the county of Furnas and State of Nebraska, have invented certain new and useful Improvements in Excavating Mechanism for Beet-Harvesters, of which the following is a specification.

This invention relates to beet harvesting mechanism and more particularly to the beet excavating elements thereof, and has for its object to provide a plow structure for beet harvesters which will be arranged to excavate the beets from the earth and deliver them to suitable conveyers for transmission of the beets to another part of the machine.

Another object is to provide a structure in which the excavating members may be adjusted to suit different conditions, and in which they may be at times raised bodily from the ground for transportation of the machine from place to place.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevation of the forward portion of a beet harvester including the present structure, Fig. 2 is a front elevation, Fig. 3 is a vertical section taken through the guide members, the slide blocks, the plow members and the spacing block, Fig. 4 is a section taken at right angles to Fig. 3 showing the means for lifting the slide blocks, Fig. 5 is a view showing the members in top plan.

Referring now to the drawings, there is shown the forward portion of a beet harvesting machine, consisting of two parallel side members 11 and 12, and a front member 13. Depending from the front member, there are a pair of vertically extending guide uprights 15 supported at their lower ends upon the horizontal bight portion 16 of a yoke 16', including upwardly and outwardly extended legs 17 having vertical upper end portions 18 secured against the outer faces of the side members 11 and 12. A pivot bolt 19 is engaged through the bight 16 of the yoke 16', and has a transverse axle 20 pivoted upon the lower portion of the bolt. This axle has upwardly offset end portions 21 which receive ground wheels 22.

Grooved slide blocks 23 are engaged with the inner faces of the upright guide members 15, the guide members being engaged in the grooves of the blocks, and engaged transversely in the slide blocks there is a rod 24 which thus lies horizontally, and which has pivoted thereupon the forward ends of a pair of plow beams 25, which extend rearwardly and then downwardly. These plow beams are held in spaced relation at their forward portions by means of a block 26 engaged upon the rod 24, and at their rearward portions the plow beams are separated by means of a transverse brace 27, having a link 28 pivoted thereto. The link 28 extends upwardly and is pivoted to the crank 29 of a transversely extending shaft 30 journaled upon the forward portion of the side members 11 and 12. A hand lever 31 is secured to the shaft 30 for movement thereof, and a rack 32 is provided for engagement by a dog 33, to hold the hand lever at different points of its movement. It will thus be observed that the shaft 30 may be moved to raise and lower the rearward portions of the plow beams. Shares 35 are carried by the rearward extremities of the plow beams and have inwardly directed mold boards 34 which are in the form of bars extending inwardly and rearwardly, and which are arranged to receive excavated beets therebetween and discharge them against the lower end of a conveyer 36 which extends upwardly and rearwardly from the rearward end of the bars 34, as shown. The conveyer 36 includes a lever roller member 43 which is revolubly mounted upon the transverse bight portion 44 of a yoke 45 which is pivoted at its forward end to the downwardly directed portions of the plow beams 25. This structure permits the vertical adjustment of the plow beams with respect to the conveyer, and, as shown, the conveyer being pivoted at its upper portion, the structure is such that the bodily vertical movement of the plow members is not interfered with. A second shaft 49 is journaled in the side members 11 and 12, and has a forwardly extending arm 46 connected with the downwardly extending link 47 which is engaged with the spacing block 26. A hand lever 48 is provided for movement of the shaft 49, and by operation of this hand lever, the plow members with the slide block 23 may be raised, as will be understood. It is of course understood that the crank 29 must be raised at the same time.

What is claimed is:—

1. In a beet excavating mechanism, the combination with a frame, of depending upright guide members carried by the frame in spaced relation, slide blocks engaged between the uprights, a rod transversely engaged in the slide blocks, plow beams pivoted upon the rod, a block engaged with the rod between the plow beams to hold the beams in spaced relation, and means for moving the beams upon the rod.

2. In a beet harvester, the combination with the frame, of depending upright guide members carried by the frame in spaced relation, slide blocks engaged between the uprights, a rod transversely engaged in the slide blocks, plow beams pivoted upon the rod, a block engaged with the rod between the plow beams to hold the beams in spaced relation, a spacing rod engaged between the plow beams rearwardly of the block, an upwardly extending link engaged with the spacing rod, and means for elevating the link to raise the rearward portions of the plow beams.

3. In a beet harvester, the combination with a frame, of depending uprights carried by the frame in spaced relation, slide blocks engaged between the uprights, a rod engaged in the slide blocks and extending transversely between the uprights, plow beams pivoted at their forward ends upon the rod, a spacing block engaged with the rod between the plow beams, and means for raising and lowering the spacing block.

4. In an excavating mechanism for harvesters, the combination with guide members, of members mounted for vertical movement between the guide members, plow beams pivotally connected with the vertically movable members, excavating members connected with the plow beams, means for moving the plow beams pivotally with respect to the vertically movable members, and means for elevating the vertically movable members.

5. In an excavating mechanism for beet harvesters, the combination with vertically movable and vertically adjustable plow beams, of plow shares carried by the lower ends of the beams, inwardly extending bars carried by the shares, said bars converging rearwardly, a rearwardly extending member connected with the beams for pivotal movement, and a conveyer pivotally connected with the rearwardly extending member and arranged to receive excavated beets from the rearwardly converging bars.

In testimony whereof I affix my signature, in presence of two witnesses.

HENRY F. BARBER.

Witnesses:
R. B. EATON,
R. R. CLARK.